Sept. 27, 1955   G. M. DUNN   2,718,874
BIRD LANDING AND FEEDING STATION
Filed Oct. 9, 1952
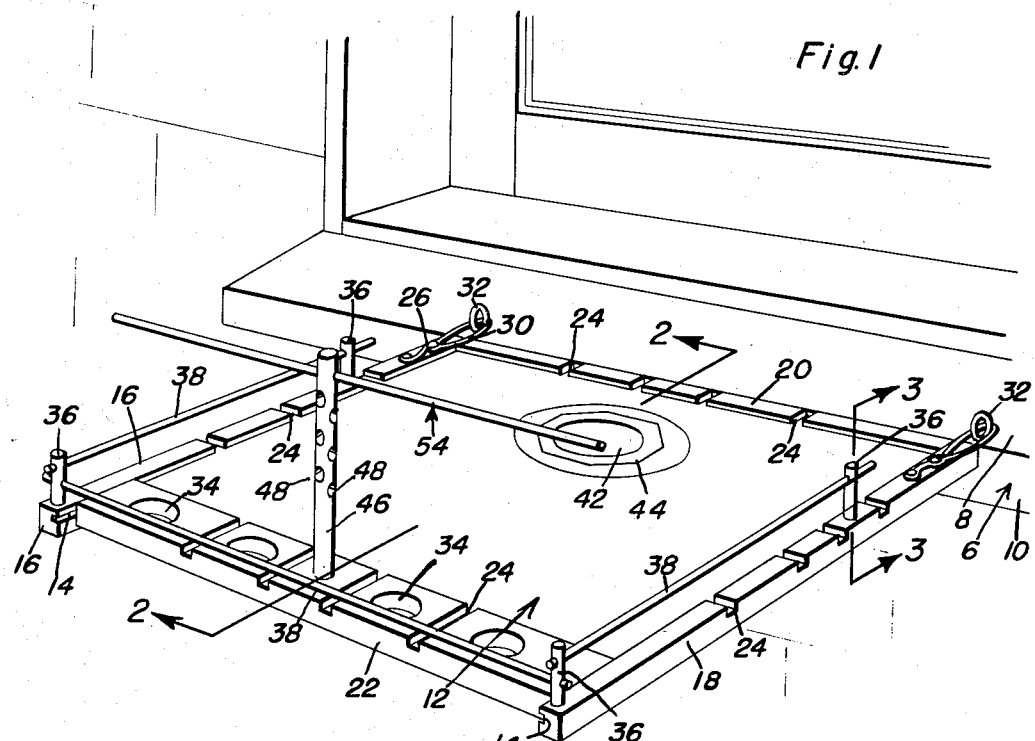
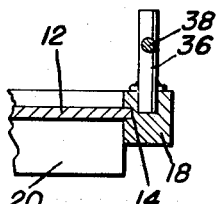
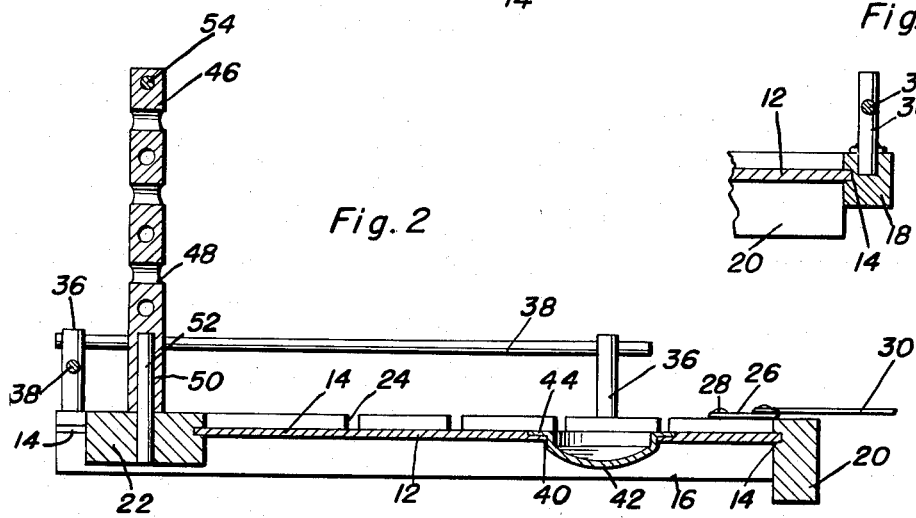
Gilbert M. Dunn
INVENTOR.

United States Patent Office 2,718,874
Patented Sept. 27, 1955

2,718,874
BIRD LANDING AND FEEDING STATION
Gilbert M. Dunn, Concord, N. H.
Application October 9, 1952, Serial No. 313,904
1 Claim. (Cl. 119—51)

The present invention relates to certain new and useful improvements in wild bird feeders, and has more particular reference to one which may be conveniently and reliably supported on the exterior of a window sill and which is characterized by a landing and take-off platform and wherein the latter is provided with certain advantageously usable facilities.

As the preceding statement of the invention implies, so-called window sill wild bird feeders are not new. As a matter of fact, a number of different styles and forms of feeders have been evolved and produced for use by others. An object of the instant invention is to structurally, functionally and otherwise improve upon known prior art bird feeders in the field of endeavor under consideration and in doing so, to provide one in which manufacturers and the users will find their respective requirements and general needs aptly and adequately available.

A further object of the invention, stated in general terms, is to improve upon and reduce the number of parts entering into the over-all combination, thereby not only increasing the efficiency of the structure as an entity, but also rendering the same less costly to manufacture and to otherwise simplify factors of assembling, sale, repair and replacement, etc.

Another object of the invention has to do with a wild bird landing and feeder construction which is characterized by a platform having a marginally surrounding frame, one of the members of which is adapted to rest firmly against a vertical surface of a window sill, said frame being provided with hold-down anchors or fasteners, the latter having elongated projecting loops and said loops being releasedly engageable with eye screws or equivalent fasteners driven or screwed into the window sill.

A further object of the invention is to provide a frame equipped platform of light weight but considerable durability wherein the upper surfaces of the members of the frame are provided with notches providing drainage gutters, at least one of said frame members having recesses therein forming selectively usable seed wells.

Novelty is predicated on the aforementioned construction in conjunction with a marginally arranged fence made up of corner posts and accompanying rails.

In addition, novelty is predicated on a readily attachable and detachable upright which is hereinafter referred to as a feeding stick, the same being provided with an attachable and detachable additional horizontal stick usable as a bird resting perch.

Other objects, features and advantages will become more readily apparent from the following description and the accompanying sheet of illustrative drawings.

In the drawings, wherein like numerals are employed to designate like parts throughout the views:

Figure 1 is a perspective view showing a fragmentary portion of a window and window sill, and showing the improved readily attachable and detachable wild bird landing and feeding station, its construction and mode of use;

Figure 2 is an enlarged section, with parts in elevation, taken on the plane of the horizontal line 2—2 of Figure 1 looking in the direction of the arrows;

Figure 3 is an enlarged vertical section on the line 3—3 of Figure 1; and

Figure 4 is a fragmentary enlarged perspective of one corner with the novel attaching means.

Referring now to the drawings and first to Figure 1, the window sill, an important component of the over-all combination, is denoted by the numeral 6 and is, of course, a conventional type and includes a horizontal surface 8 and a vertical surface 10.

The readily attachable and detachable landing and take-off station and its components takes the form of an attachment. This is characterized by a flat horizontal panel 12 which may be described as a platform. This is preferably of Masonite and has a rough surface which faces upwardly. It is approximately flat and rectangular in form and the marginal edge portions thereof fit into grooves 14 provided therefor in the various inner-marginal surfaces of the frame members. The frame itself is approximately rectangular and it borders the marginal edge portions of the platform. The end or side frame members are denoted by the numerals 16 and 18. The innermost frame member is denoted by the numeral 20, and this is of a greater cross-section than the rest of the frame members and it is adapted to bear against the vertical surface 10 of the window sill. The opposite outward or front frame member is denoted by the numeral 22. All of these frame members are provided with longitudinally spaced notches 24 which serve as water drainage gutters. In this way, water is prevented from needlessly pooling on the platform. The frame members may be of tongue and groove stock if desired, or they may simply be fastened on the marginal edges of the platform by way of the aforementioned grooves 14 and then glued or otherwise connected together at their corners. Wire fasteners are employed on the two frame members 16 and 18 and these have portions 26 which are fastened into eyes, the latter are screwed into place by screws 28. The fasteners also include extending keeper loops 30 which are engageable over hold-down screws secured in the horizontal surface of the window sill. Actually these hold-down members are eye screws, and are denoted by the numerals 32, and they may be turned to line up with the lengthwise slots in the loops or they may be turned crosswise when it is desired to more securely bind the loop portions of the fasteners to the sill. These eye screws, the loop fasteners and co-acting flat surfaces of the window sills and frame member 20 provide a highly satisfactory junctural cooperation between the frame supported platform and the window sill.

The frame member 22 in addition to having notches is also provided with recesses 34 which function as seed containing wells. If desired, the bottom portions of these may be bored through (not detailed) to prevent water from being trapped in and retained in the wells.

Short dowels forming what may be called corner posts are provided and these are denoted by the numerals 36. They are fastened to the frame members adjacent the corner portion and they are provided with openings to accommodate guard rails 38—38 which go to make up a suitable marginal fence.

The numeral 40 as best shown in Figure 2 designates a hole in the platform to accommodate a watering cup 42 having a supporting flange 44.

In addition, a T-shaped accessory is provided as a further facility and this comprises an upright which is more specifically referred to as a stick 46. It has a multiplicity of horizontal holes 48 which are bored therein and which actually provide either sockets or pockets. These pockets are intended to be loaded with bird food. There is also a vertical axial socket 50 in the bottom of the stick to receive the upper end portion of a peg 52 which is suitably fastened in the frame member 22 as best shown in Figure 2. There is a hole at the top of the stick to accommodate a second horizontal stick 54 which serves as a bird roosting perch.

The four seed wells or containers for the wild bird seeds are drilled to sufficient diameters and depths with a miniature puncture in the center of each to permit rain drainage. The feeding stick 46 is a component of the over-all assemblage and has been included to attract the non-vegetarian birds as well as the seed eating varieties. Removability of the feeding stick simplifies the reloading chores. The aluminum drinking cup 42 tends to contribute to the completeness of the overall structure. The four corner posts and the three complemental rails which border the platform or station on three sides takes on an attractive fence-like design. However, the fence rails serve usefully as a landing perch for all bird visitors. Once on the station, the birds landing may choose the rails since they are best suited to their claws. The Masonite "deck" is installed with the rough side up which adds to the more secure surface footing. The perch rail atop the feeding stick is also a decorative feature and serves most usefully as an additional but elevated landing perch. The simple method of attaching and detaching the feeding station is a novel introduction and an extremely desirable feature. Merely screw the two screw eyes by hand into place and place the bracing and fastening loops over the eyes and the device is installed and ready for use. To remove the station for cleaning, simply turn the eye screws in the right direction as shown in Figure 1, for example, and unhook the fastener loops.

It is thought that persons skilled in the art to which the invention relates will be able to obtain a clear understanding of the invention after considering the description in connection with the drawings. Therefore a more lengthy description is regarded as unnecessary.

Minor changes in the shape, size and arrangement of details coming within the field of invention claimed may be resorted to in actual practice, if desired.

Having described the invention, what is claimed as new is:

A bird landing and feeding station comprising a platform, a plurality of connected frame members marginally circumscribing the platform and having grooves cooperating and receiving the edge portions of said platform and defining a bracing and sill attaching frame, at least one of said frame members having drainage gutters, at least one of said members having feed containing wells, fasteners carried by the frame members and adapted to secure the structure as an entity on a window sill, fence posts secured in said frame members, and rails carried by said posts.

References Cited in the file of this patent

UNITED STATES PATENTS

| | | |
|---|---|---|
| D. 117,482 | Mustarkes | Nov. 7, 1939 |
| 192,727 | Zimmerman | July 3, 1877 |
| 1,558,977 | Gray | Oct. 27, 1925 |
| 2,063,289 | Alusas | Dec. 8, 1936 |
| 2,306,312 | Hyde | Dec. 22, 1942 |
| 2,583,838 | Hart | Jan. 29, 1952 |
| 2,693,787 | Morey | Nov. 9, 1954 |

OTHER REFERENCES

Farmers' Bulletin No. 912, February 1918, pages 7 and 8.